(12) United States Patent
Heiman

(10) Patent No.: US 7,307,992 B2
(45) Date of Patent: Dec. 11, 2007

(54) SYSTEM AND METHOD FOR THE TRANSMISSION OF MESSAGE TRAFFIC

(75) Inventor: Petri Heiman, Vantaa (FI)

(73) Assignee: Nokia Corporation, Espoo (FI)

( * ) Notice: Subject to any disclaimer, the term of this patent is extended or adjusted under 35 U.S.C. 154(b) by 1253 days.

(21) Appl. No.: 10/046,471

(22) Filed: Jan. 10, 2002

(65) Prior Publication Data

US 2002/0110128 A1      Aug. 15, 2002

Related U.S. Application Data

(63) Continuation of application No. PCT/FI00/00641, filed on Jul. 11, 2000.

(30) Foreign Application Priority Data

Jul. 14, 1999    (FI) ..................................... 991607

(51) Int. Cl.
*H04L 12/28*    (2006.01)

(52) U.S. Cl. ................... 370/395.1; 370/401

(58) Field of Classification Search ..................... None
See application file for complete search history.

(56) References Cited

U.S. PATENT DOCUMENTS

| | | |
|---|---|---|
| 5,533,006 A | 7/1996 | Uchida |
| 5,724,348 A | 3/1998 | Basso et al. |

FOREIGN PATENT DOCUMENTS

| | | |
|---|---|---|
| EP | 1 041 854 | 10/2000 |
| WO | WO 99/11028 | 3/1999 |
| WO | WO 99/33319 | 7/1999 |

OTHER PUBLICATIONS

Kurano, et al., "Giga-Bit ATM Cross-Connect System with STM-ATM Conversion Function", *IEEE*, pp. 1461-1467, (1993).
International Search Report for PCT/FI00/00641.
Rathgeb, et al., "The MainStreet*Xpress* Core Services Node-A Versatile ATM Switch Architecture for the Full Service Network", *IEEE Journal On Selected Areas In Communications*, vol. 15, No. 5, pp. 795-806, (Jun. 1997).

*Primary Examiner*—Chau Nguyen
*Assistant Examiner*—Christine Ng
(74) *Attorney, Agent, or Firm*—Squire, Sanders & Dempsey L.L.P.

(57) ABSTRACT

The present invention concerns a method and a system for the transmission of message traffic in a packet-switched telecommunication system, said system comprising a network element, which comprises a cross-connection part and a control part, said cross-connection part comprising at least one unit computer and said control part comprising at least one unit computer, said system further comprising means for the transmission of internal message traffic within the network element between the unit computers. According to the invention, the system comprises at least one unit computer in the cross-connection part whose message traffic is transmitted by utilizing the universal cross-connections produced by the network element itself, said unit computer of the cross-connection part being disposed on a different plug-in unit than the nearest terminal point of the cross-connection it is using for message traffic. The invention provides the advantage of good scalability of the system.

11 Claims, 6 Drawing Sheets

SYSTEM AND METHOD FOR THE TRANSMISSION OF MESSAGE TRAFFIC

Figure 1:
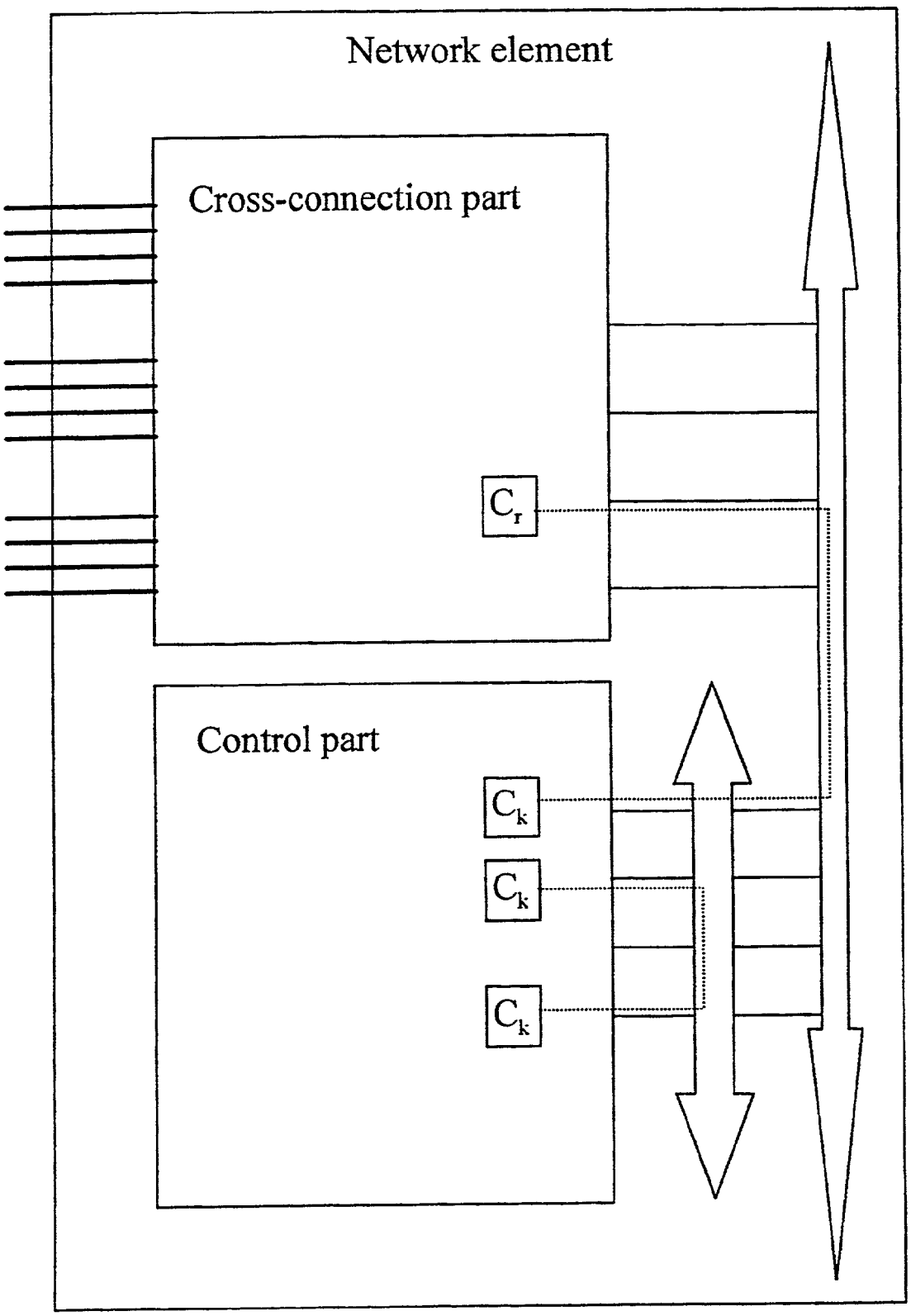

This application is a continuation of international application serial number PCT/FI00/00641, filed 11 Jul. 2000.

FIELD OF THE INVENTION

The present invention relates to telecommunication. In particular, the invention relates to a new and advanced method and system for the transmission of message traffic in the network elements of packet-switched telecommunication systems.

BACKGROUND OF THE INVENTION

At present, several methods for the transmission of the message traffic between the unit computers of the network elements of packet-switched telecommunication systems are known. For the implementation of the packet-switched telecommunication system itself, one method is to use the ATM technique (Asynchronous Transfer Mode, ATM). Another example of packet-switched methods is the Frame Relay technique.

ATM is a connection oriented packet-switched data transfer method which is characterized by the use of standard-length cells for data transfer. Each cell consists of a 5-byte header and a 48-byte information part. The header fields comprise a virtual path identifier (VPI) and a virtual channel identifier (VCI), a payload type identifier (PTI), a cell loss priority bit (CLP) and a header error control (HEC) which can be used to correct one-bit errors and to detect two-bit errors. In an ATM switch, the cells are transferred from a logical input channel to one or more logical output channels. A logical channel consists of the number of the physical link, such as e.g. an optic fiber, and the identifier of the channel in this link, i.e. the VPI/VCI data. A single physical transmission medium, such as an optic fiber, may contain a plurality of virtual paths VP, and each virtual path may contain a plurality of virtual channels VC.

Since the cells have a standard length, the switching in the ATM switches can be performed on the basis of the cell header at hardware level and therefore very fast. Cells belonging to different connections are distinguished from each other by the virtual path and virtual channel identifiers. To set up a connection over the network, a fixed route, i.e. a virtual link is defined, and the cells comprised in the connection are routed along this virtual link. In the nodes of the network, the cells are connected on the basis of the VPI/VCI values. The VPI/VCI values of the cells are defined separately for each leg of the connection, so they generally change in conjunction with the connection of VP-level or VC-level. At the end of the data transfer, the link is disconnected.

The ATM protocol is described using an ATM protocol model, which is a layered model resembling the OSI (Open Standards Interconnection) model. The topmost level in the model is the data coming from the user. The next layer below it is an ATM adaptation layer (AAL). Below that is again an ATM layer, below which there is further a physical layer (PHY). The AAL layer is divided into two parts, a SAR layer (Segmentation And Reassembly) and a CS layer (Convergence Sublayer). The CS layer is further divided into two sublayers: SSCS layer (Service Specific Convergence Sublayer) and CPCS layer (Common Part Convergence Sublayer).

The ATM adaptation layer divides the frames of the layers above it into pieces, places the pieces into cells and reassembles the frames at the receiving end.

The ATM layer again offers a cell transfer service to the AAL layer. It only deals with the cell header, taking care of the connection, multiplexing and demultiplexing of cells, generation and deletion of cell header, and generic flow control (GFC) at the user network interface (UNI). In addition, the ATM layer takes care of detection and correction of header errors as well as segment synchronization.

The physical layer is also divided into two sublayers, a PMD (Physical Medium Dependent) sublayer, which takes care of transfer-system specific functions at bit level; and a transmission convergence sublayer (TCS), which takes care of adaptation of cells to each transmission system and definition of cells, error checks on cell headers and cell rate adjustment.

A network element consists of a cross-connection part, which takes care of actual cross-connection of data, and a control part, which performs various control actions. Typically, both the cross-connection part and the control part comprise several unit computers. Message traffic flows between these unit computers.

FIG. 1 presents a prior-art solution for the transmission of message traffic between unit computers 20 in the network elements of packet-switched telecommunication systems. The message traffic between the unit computers $C_k$ of the control part is transmitted via a separate higher-capacity path and the message traffic e.g. for the setup of cross-connections between the unit computers $C_r$ of the cross-connection part and the unit computers $C_k$ of the control part is transmitted via a separate lower-capacity path. In the figure, the dotted line represents a message traffic connection.

Figure 2:
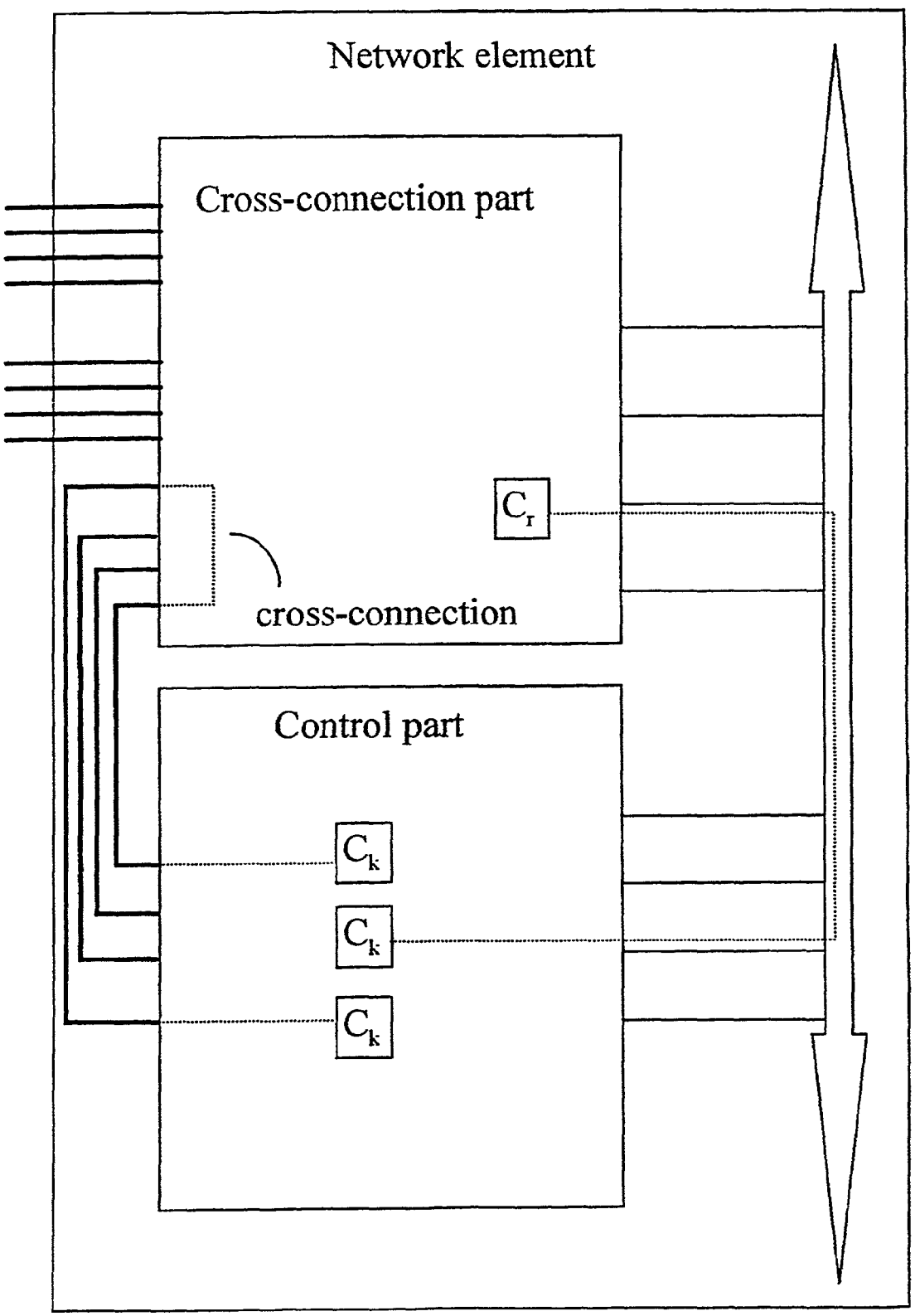

Another prior-art solution is presented in FIG. 2. The message traffic between the unit computers $C_k$ of the control part has been routed via the network element's own cross-connections. However, the message traffic between the unit computers $C_r$ of the cross-connection part and the unit computers $C_k$ of the control part still flows via a separate path.

Figure 3:
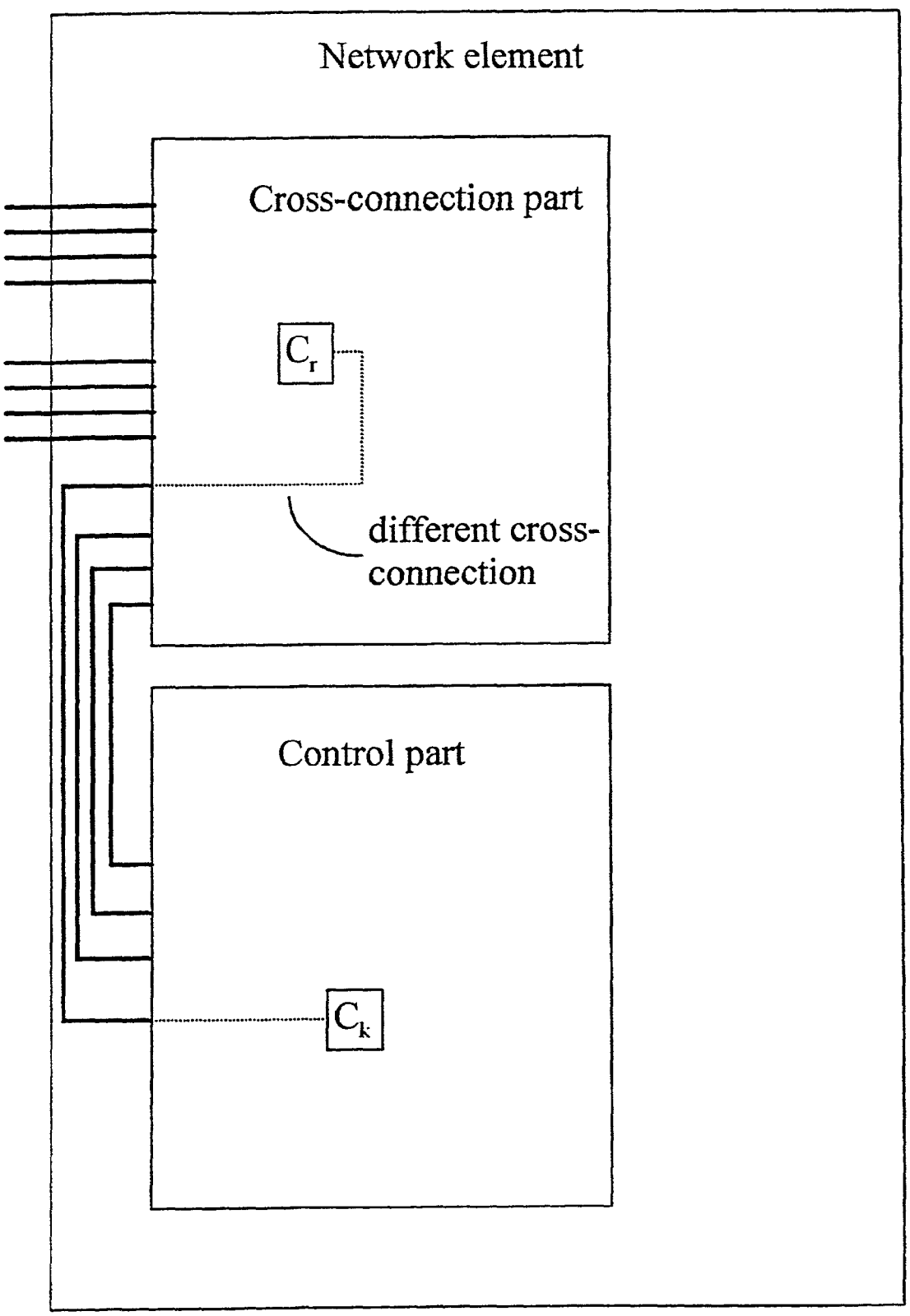

FIG. 3 also presents a prior-art implementation. In this case, the cross-connection is not a universal connection. An example of this type of different cross-connection is to transmit, in systems based on the ATM technique, so-called in-band control cells which flow along with the rest of the traffic and which are removed from the cell flow by the target circuit. Another example of different cross-connection is an implementation in which a unit computer is placed directly on the plug-in unit of the second terminal point of the cross-connection.

However, such solutions have the drawback of poor scalability. The improve the scalability of the message traffic system, projects have been started to develop systems e.g. in ATM networks in which the ATM switch itself is used for the transmission of message traffic, in which case message traffic would be carried in the subscriber traffic flow. In such a system, e.g. in the case of ATM, the computer units are connected to the ATM switching fabric either directly via a separate line card or via an ATM multiplexer. The unit computers of the line cards, i.e. plug-in units, are connected to the ATM switching fabric via the ATM circuits on the cards to allow the transmission of message traffic. This is the fundamental principle behind e.g. the system described in an article entitled The MainStreetXpress Core Services Node—A Versatile ATM Switch Architecture for the Full Service Network, published in IEEE Journal on Selected Areas in Communications, Vol. 15, No. 5, June 1997.

A problem in the prior-art systems is that they are dependent on circuit-specific properties, such as, e.g. in the case of ATM, the cell insertion and deletion functions of the ATM circuit. As a consequence, each plug-in unit type needs a specific type of SAR (Segmentation And Reassembly) interface for connection to the ATM circuits in the plug-in unit in question. A further problem is that the transmission of both subscriber traffic and message traffic via the same lines is difficult to manage.

The object of the invention is to disclose a new type of system and method that will eliminate the problems referred to above. A specific object of the invention is to disclose a flexible and optimal system and method for the transmission of message traffic in packet-switched telecommunication systems.

BRIEF DESCRIPTION OF THE INVENTION

In the present invention, internal message traffic within a network element is transmitted between the unit computers of the cross-connection part of the network element and/or the unit computers of the control part in a packet-switched telecommunication system, said system comprising a network element, which again comprises a cross-connection part comprising at least one unit computer. In this context, 'network element' means e.g. a telephone switching center implemented utilizing the ATM technique. In addition, the network element comprises a control part which comprises at least one unit computer. According to the invention, the system comprises in the cross-connection part at least one unit computer whose message traffic is transmitted by utilizing the universal cross-connections produced by the network element itself. In addition, this unit computer of the cross-connection part is disposed on a plug-in unit other than the plug-in unit on which is disposed the nearest terminal point of the cross-connection used by the said unit computer for the transmission of message traffic. In practice, both the cross-connection part and the control part are often disposed on several plug-in units. Thus, the invention allows a situation where the above-mentioned unit computer of the cross-connection part and the nearest terminal point of the cross-connection used are on different plug-in units. Direct communication between unit computers on the same plug-in unit is previously known.

In an embodiment of the invention, the system comprises at least one control part unit computer whose message traffic is transmitted by utilizing the universal cross-connections produced by the network element itself.

In an embodiment of the invention, the functions of the control part are distributed among the plug-in units of the cross-connection part. In this case, too, the communication by the cross-connection part can be regarded as being implemented as described above.

In an embodiment of the invention, the telecommunication system is a communication system based on the ATM technique (Asynchronous Transfer Mode, ATM).

In an embodiment of the invention, the cross-connection part comprises one or more computer units, each comprising a SAR-PHY circuit pair (Segmentation And Reassembly, SAR; Physical Layer, PHY) and a unit computer. The SAR circuit is a circuit which performs at least some of the functions defined for the SAR sublayer comprised in the ATM protocol model, said functions comprising e.g. the segmentation of user data coming from a higher layer into segments that, when transferred to a lower layer, fit into the payload fields of successive ATM cells. In addition, these functions include the reassembly of segmented data coming from lower layers for transfer to higher layers.

Similarly, the PHY circuit (physical layer circuit) is a circuit which performs at least some of the functions defined for the physical layer, including e.g. transfer system-specific bit-level functions and taking care of the adaptation of cells to each transfer system as well as the definition of cells, error checks on cell headers and adjustment of cell rate. The SAR-PHY circuit pair consists of a SAR circuit and a PHY circuit.

In an embodiment of the invention, the cross-connection part comprises one or more LIU units (Line Interface Unit, LIU), each of which comprises a unit computer, a SAR-PHY circuit pair, a PHY circuit and an ATM circuit (ATM layer circuit). The LIU unit is e.g. a line card provided with a plurality of lower-speed interfaces, such as e.g. prior-art T1, J1 and/or J2 interfaces. Naturally, the interfaces may also be higher-speed types, such as e.g. prior-art STM-1 or E1 interfaces, but in this application such interfaces may not allow the best possible utilization of capacity. The ATM circuit again is a circuit which performs at least some of the functions defined for the ATM layer, including e.g. the multiplexing and connection of cells, provision of virtual connections between terminal points and maintenance of an agreed level of quality of service (QOS).

In an embodiment of the invention, the cross-connection part comprises an ATM switching fabric (ASF), which comprises a unit computer, a SAR-PHY circuit pair and an ATM circuit. As indicated by its name, the ATM switching fabric takes care of switching functions.

As compared with prior art, the present invention has the advantage of being independent of circuit-specific properties, such as e.g. the properties of ATM circuits. As the SAR circuits e.g. in the case of ATM are not directly connected to any ATM circuit, there is no need to adapt them according to individual properties of ATM circuits. Thus, the invention makes it possible to use conventional universal ATM interfaces. According to the invention, each computer unit (or unit computer) can send messages simultaneously to different unit computers. Accordingly, the same advantages are also achieved in the case of other packetswitched systems, such as e.g. the Frame Relay system. A further advantage of the invention is a good scalability.

LIST OF ILLUSTRATIONS

Figure 4:
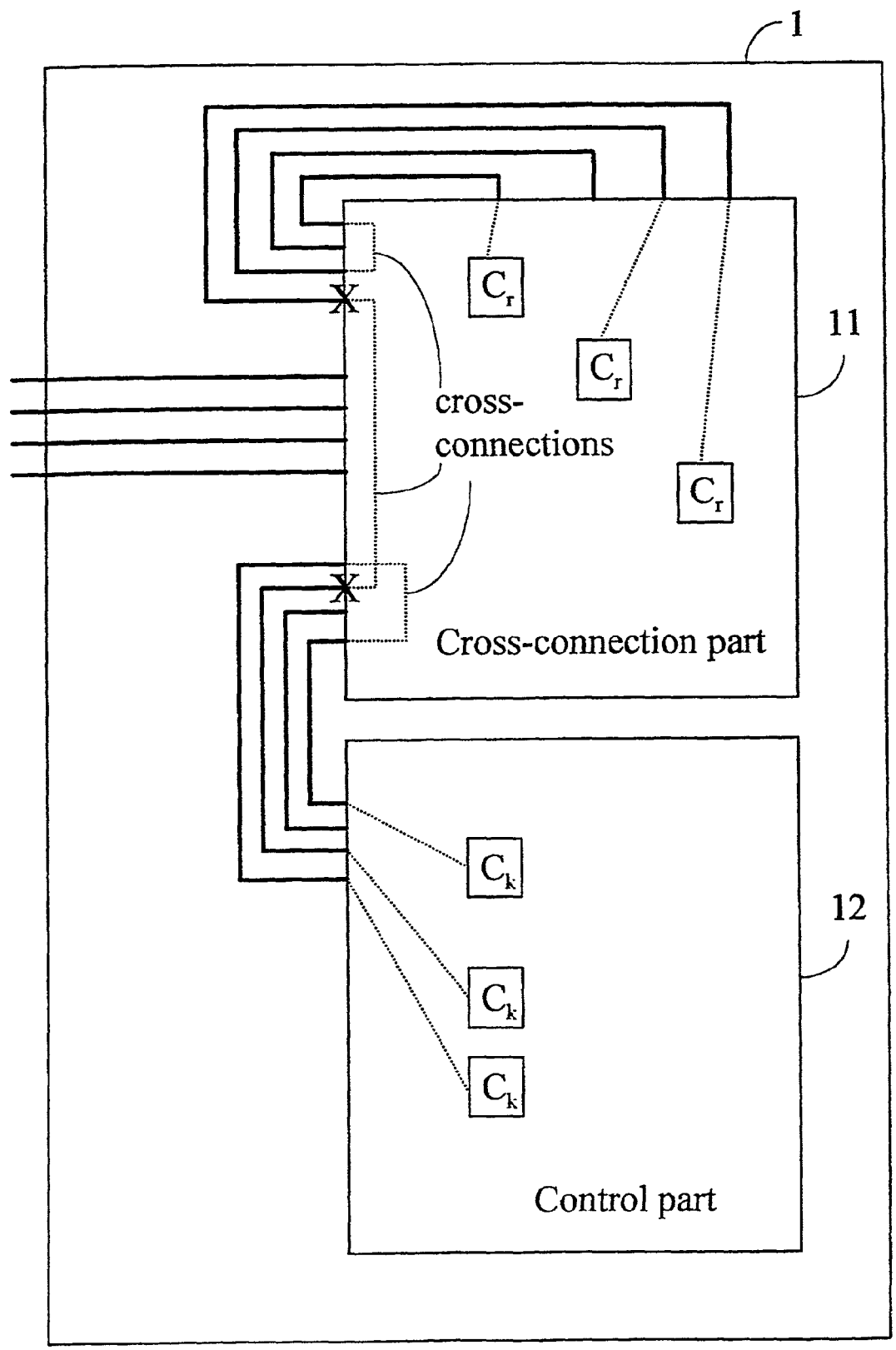
Figure 5:
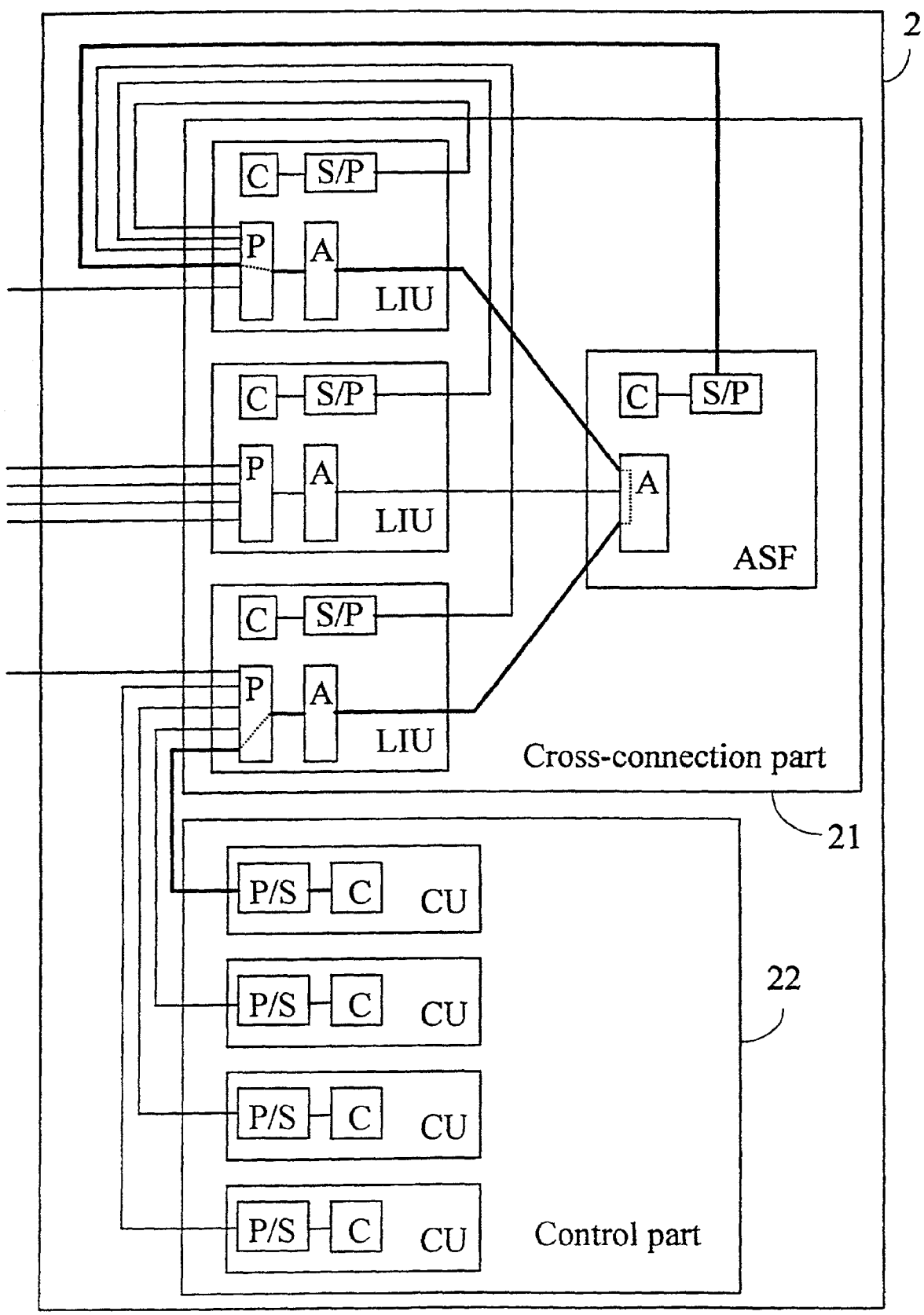
Figure 6:
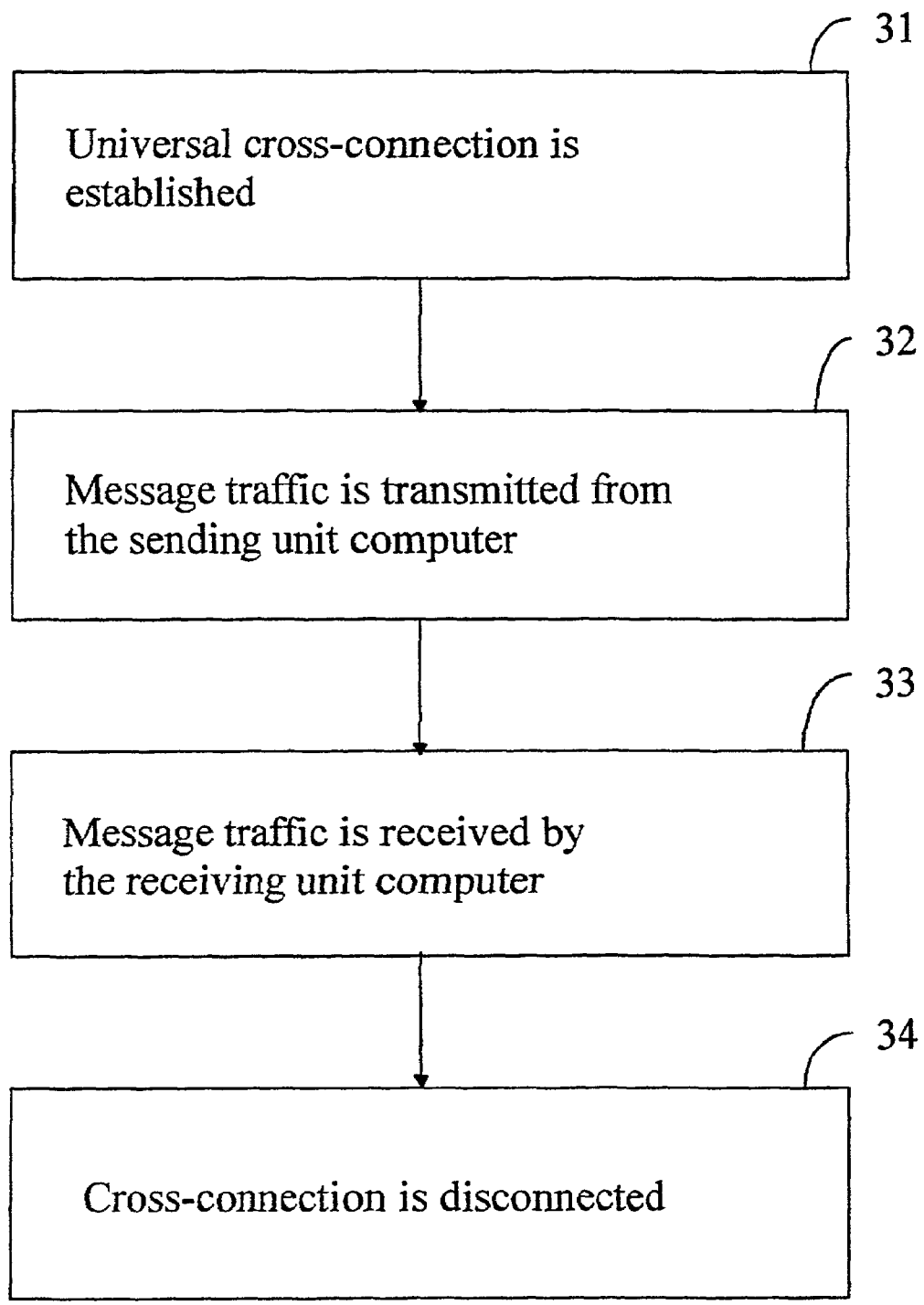

In the following, the invention will be described in detail by the aid of a few examples of its embodiments with reference to the attached drawing, wherein FIG. 1 presents a prior-art system;

FIG. 2 presents a prior-art system;

FIG. 3 presents a prior-art system;

FIG. 4 presents a block diagram representing a system according to the invention;

FIG. 5 presents a block diagram representing a system according to the invention, implemented using the ATM technique; and FIG. 6 presents a flow diagram representing a method according to the invention.

DETAILED DESCRIPTION OF THE INVENTION

FIG. 4 presents an example showing the components of a system according to the invention. The system comprises a network element 1, which comprises a cross-connection part 11, which comprises at least one unit computer $C_r$. In addition, the network element 1 comprises a control part 12, which comprises at least one unit computer $C_k$. According to the invention, the system comprises at least one unit computer $C_r$ in the cross-connection part 11 whose message traffic is transmitted by utilizing universal cross-connections produced by the network element 1 itself. This cross-connection part unit computer $C_r$ is disposed on a different plug-in unit than the nearest terminal point of the cross-connection used by it for message traffic. In practice, both the cross-connection part and the control part are often disposed on several plug-in units (not shown in the figure). Thus, the invention allows a situation where the cross-connection part unit computer $C_k$-$C_r$ in question and the nearest terminal point of the cross-connection used are disposed on different plug-in units. In FIG. 4 presents an example in which the terminal points of a cross-connection being used are indicated by "X", the nearest terminal point being naturally that terminal point which is closer to the said cross-connection part unit computer $C_r$. In a preferred case, the message traffic of all the unit computers $C_r$ of the cross-connection part 11 is transmitted in the manner described above, although this is not absolutely necessary.

FIG. 5 presents an example of a system according to the invention, implemented using ATM based components. However, the system of the invention is in no way tied to the ATM technique; instead, it can be applied to any other packet-switched system, such as e.g. systems based on the Frame Relay technique. The implementation presented in FIG. 5 is only an example of how the system of the invention can be implemented using the ATM technique. There are also many other possibilities to implement the system of the invention using ATM. The system comprises a network element 2, which comprises a cross-connection part 21 and a control part 22. The control part 22 comprises a number of computer units CU, each of which comprises a SARPHY circuit pair P/S and a unit computer C. The functions of the computer units CU may include e.g. control of the switching fabric, taking care of input and output side signalling and monitoring, collection of call-specific billing data, collection of statistics and/or execution of traffic measurements. In practice, the computer unit CU may be e.g. an operations and maintenance unit (OMU). The cross-connection part 21 comprises one or more LIU units LIU and a ATM switching fabric ASF. Each LIU unit LIU comprises a unit computer C, a SAR-PHY circuit pair S/P, a PHY circuit P and an ATM circuit A. The ATM switching fabric ASF again comprises a unit computer C, a SAR-PHY circuit pair S/P and an ATM circuit A. Thus, the SAR-PHY circuit pair and the conductor together form a universal ATM interface.

Thus, in the system of the invention, e.g. an ATM switch is used for making the connections for message traffic between the computer units and the unit computers of the plug-in units. However, message traffic connections are just normal cross-connections as are made for subscriber traffic as well. Therefore, the operation of the system of the invention is completely independent of the properties of the ATM circuits, because the SAR circuits are not directly connected to any ATM circuit.

FIG. 6 presents a flow diagram representing a method according to the invention. In step 31, a universal cross-connection is established. In step 32, message traffic is transmitted from a sending unit computer, the cross-connection part unit computer in question being disposed on a different plug-in unit than the nearest terminal point of the cross-connection it is using for message traffic. Next, in step 33, the message traffic is transmitted to the receiving unit computer. Finally, in step 34, the cross-connection is disconnected.

The invention is not restricted to the examples of its embodiments described above; instead, many variations are possible within the scope of the inventive idea defined in the claims.

The invention claimed is:

1. System for the transmission of message traffic in a packet-switched telecommunication system, said system comprising:

a network element, which comprises a cross-connection part and a control part, said cross-connection part comprising at least one unit computer, and said control part comprising at least one unit computer, wherein internal message traffic is transmitted within the network element between the unit computers, wherein the system further comprises:

at least one unit computer in the cross-connection part whose message traffic is transmitted by utilizing universal cross-connections conveying the message traffic between the cross-connection part and the control part of the network element, said unit computer of the cross-connection part being disposed on a different plug-in unit than the nearest terminal point of the cross-connection it is using for message traffic.

2. The system as defined in claim 1, wherein the system further comprises:

at least one unit computer in the control part whose message traffic is transmitted by utilizing the universal cross-connections conveying the message traffic between the cross-connection part and the control part of the network element.

3. The system as defined in claim 1, wherein the telecommunication system is implemented using asynchronous transfer mode (ATM) based components.

4. The system as defined in claim 3, wherein the control part further comprises:

a number of computer units, each one of which comprises a segmentation and reassembly-physical layer (SAR-PHY) circuit pair and a unit computer.

5. The system as defined in claim 3, wherein the cross-connection part further comprises:

a number of line interface unit (LIU) units, each one of which comprises a unit computer, a segmentation and reassembly-physical layer (SAR-PHY) circuit pair, a PHY circuit and an asynchronous transfer mode (ATM) circuit.

6. The system as defined in claim 3, wherein the cross-connection part further comprises:

an ATM switching fabric, which comprises a unit computer, a segmentation and reassembly-physical layer (SAR-PHY) circuit pair and an ATM circuit.

7. A method for the transmission of message traffic in a packet-switched telecommunication system, said method comprising:

transmitting internal message traffic within the network element between the unit computers of the cross-connection part and the unit computers of the control part of said element, wherein the method further comprises:

transmitting the message traffic of at least one unit computer in the cross-connection part by:

establishing a universal cross-connection between the sending unit computer and the receiving unit computer, transmitting the message traffic from the sending unit computer, said unit computer in question being disposed on a different plug-in unit than the nearest terminal point of the cross-connection it is using for the message traffic, transmitting the message traffic to the receiving unit computer, and disconnecting the cross-connection.

8. The method as defined in claim 7, wherein the method further comprises:

transmitting the message traffic of at least one unit computer of the control part by utilizing the universal cross-connections of the network element.

9. The method as defined in claim 7, wherein the method further comprises:

distributing the functions of the control part among the plug-in units of the cross-connection part.

10. The method as defined in claim 7, wherein the method further comprises:

transmitting message traffic in an asynchronous transfer mode (ATM) telecommunication system.

11. System for the transmission of message traffic in a packet-switched telecommunication system, said system comprising:

a network element, which comprises a cross-connection part and a control part, said cross-connection part comprising at least one unit computer, and said control part comprising at least one unit computer, and transmitter means for transmitting internal message traffic within the network element between the unit computers, wherein the system further comprises:

at least one unit computer in the cross-connection part wherein message traffic is transmitted by utilizing universal cross-connections conveying the message traffic between the cross-connection part and the control part of the network element, said unit computer of the cross-connection part being disposed on a different plug-in unit than the nearest terminal point of the cross-connection it is using for message traffic.

* * * * *